Figure 1:
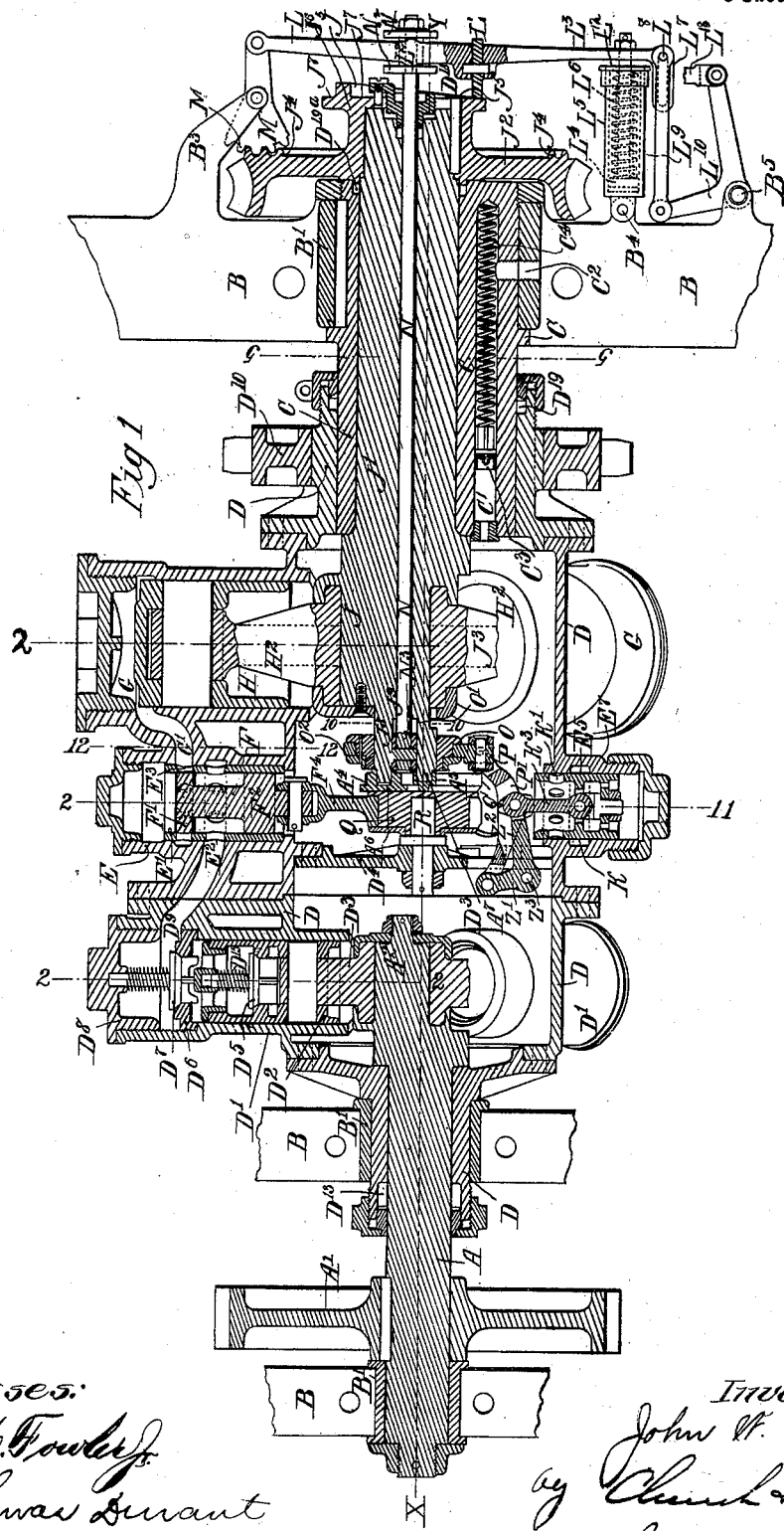

No. 626,996. Patented June 13, 1899.
J. W. HALL.
POWER TRANSMISSION APPARATUS.
(Application filed June 21, 1897.)

(No Model.) 9 Sheets—Sheet 1.

Witnesses:
J. M. Fowler Jr.
Thomas Durant

Inventor
John W. Hall
by Church & Church
his Attorneys.

No. 626,996. Patented June 13, 1899.
J. W. HALL.
POWER TRANSMISSION APPARATUS.
(Application filed June 21, 1897.)
(No Model.) 9 Sheets—Sheet 2.
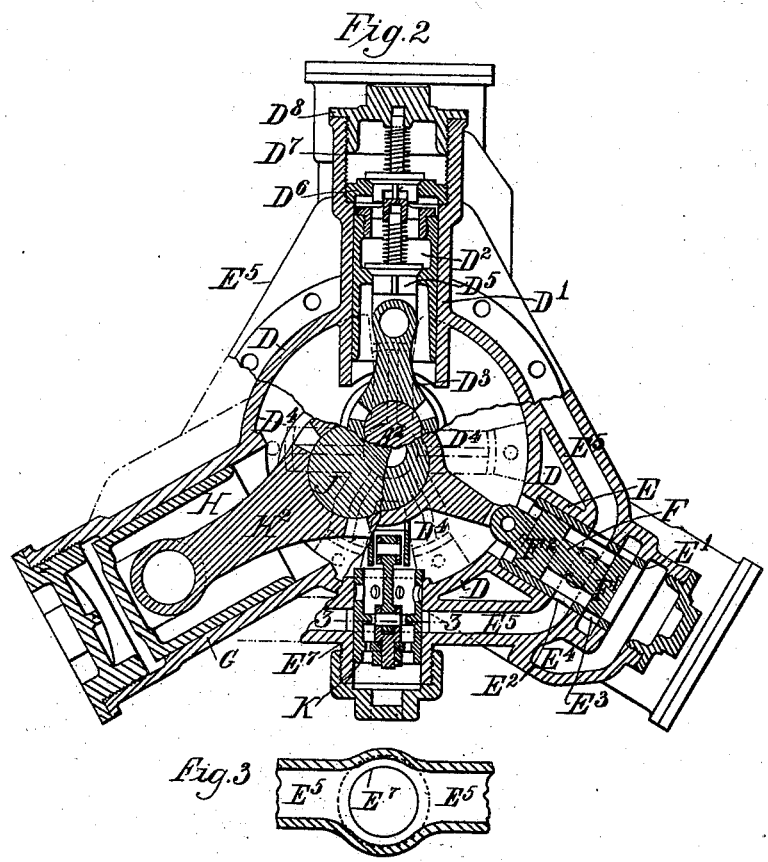
Witnesses:
J. M. Fowler Jr.
Thomas Durant
Inventor
John W. Hall,
by Church & Church
his Attorneys.
THE NORRIS PETERS CO., PHOTO-LITHO., WASHINGTON, D. C.

No. 626,996. Patented June 13, 1899.
J. W. HALL.
POWER TRANSMISSION APPARATUS.
(Application filed June 21, 1897.)
(No Model.) 9 Sheets—Sheet 3.

Witnesses:
J. M. Fowler Jr.
Thomas Durant

Inventor:
John W. Hall.
by Church & Church
his Attorneys.

No. 626,996. Patented June 13, 1899.
J. W. HALL.
POWER TRANSMISSION APPARATUS.
(Application filed June 21, 1897.)
(No Model.) 9 Sheets—Sheet 4.
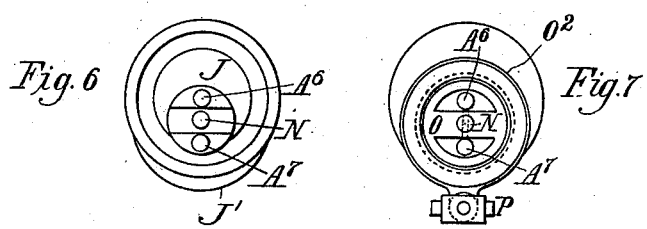
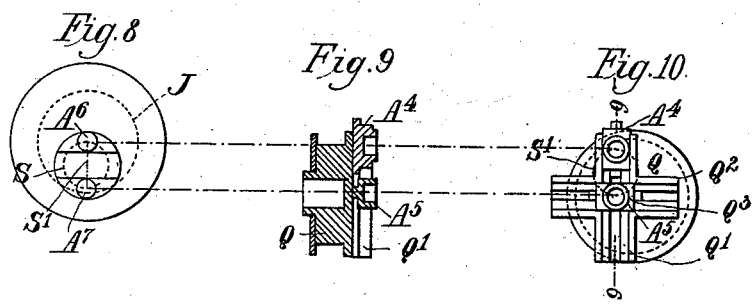
Witnesses:
J. M. Fowler Jr.
Thomas Durant
Inventor:
John W. Hall
by Church & Church
his Attorneys No. 626,996. Patented June 13, 1899.
J. W. HALL.
POWER TRANSMISSION APPARATUS.
(Application filed June 21, 1897.)
(No Model.) 9 Sheets—Sheet 5.

Witnesses.
J. M. Fowler Jr.
Thomas Durant

Inventor:
John W. Hall
by Church & Church
his Attorneys.

No. 626,996. Patented June 13, 1899.
J. W. HALL.
POWER TRANSMISSION APPARATUS.
(Application filed June 21, 1897.)
(No Model.) 9 Sheets—Sheet 6.

No. 626,996. Patented June 13, 1899.
J. W. HALL.
POWER TRANSMISSION APPARATUS.
(Application filed June 21, 1897.)
(No Model.) 9 Sheets—Sheet 7.

Witnesses:
J. M. Fowler Jr.
Thomas Durant

Inventor:
John W. Hall,
by Church & Church
his Attorneys.

No. 626,996. Patented June 13, 1899.
J. W. HALL.
POWER TRANSMISSION APPARATUS.
(Application filed June 21, 1897.)
(No Model.) 9 Sheets—Sheet 8.
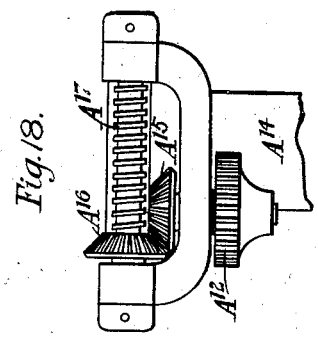
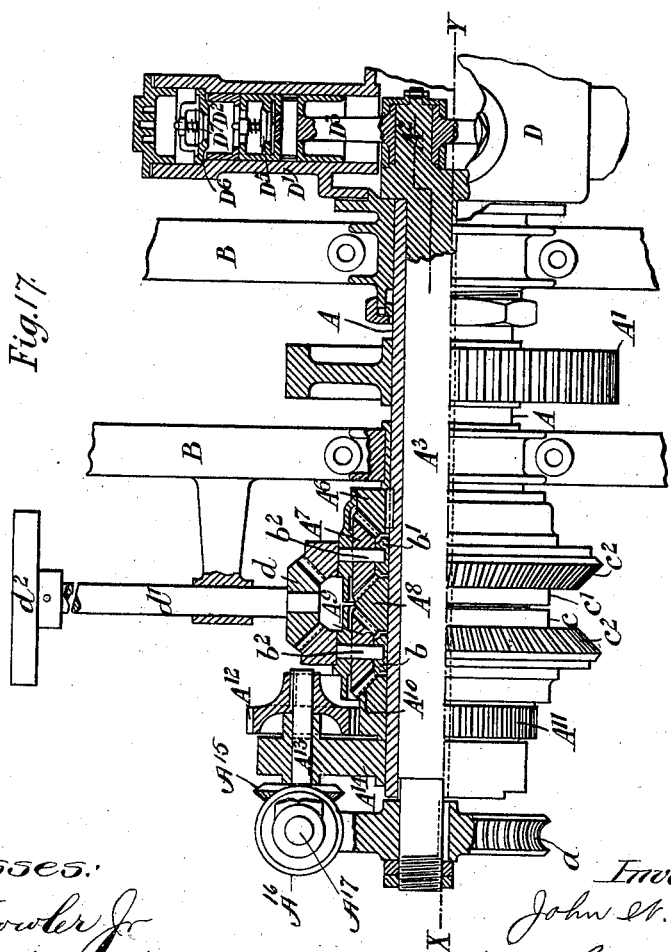

UNITED STATES PATENT OFFICE.

JOHN WILLIAM HALL, OF LONDON, ENGLAND.

POWER-TRANSMISSION APPARATUS.

SPECIFICATION forming part of Letters Patent No. 626,996, dated June 13, 1899.

Application filed June 21, 1897. Serial No. 641,687. (No model.)

*To all whom it may concern:*

Be it known that I, JOHN WILLIAM HALL, a subject of the Queen of England, residing at Brixton, London, England, have invented a certain new and useful Power-Transmission Apparatus, of which the following is a specification.

According to this invention, which is advantageous for use with autocars and other similar vehicles, as well as in numerous other applications, there is interposed between the prime mover and the road-wheel or other driven device a mechanism adapted in part to operate on and in part to be operated by a suitable fluid—say oil or water—which is circulated through it. In the description which follows the mechanism is described, by way of example, as applied to driving an autocar. The said mechanism, together with the liquid, transmits the whole of the power of the prime mover to the road-wheels; but it is so constructed that while one part of it always runs at the same speed (one which has a constant ratio to that of the prime mover to which it is connected) the other part connected with the road-wheels or driven device can be made to run at any desired speed between *nil* and a maximum at will. Consequently the apparatus can be used to control the speed of the vehicle independently of that of the prime mover and also, if desired, the direction of rotation of the driven part.

The accompanying drawings are intended to illustrate, by way of example, particular ways in which the invention can be carried into effect; but the details and general arrangement of the apparatus may be greatly modified without departure from the spirit of the invention.

Figure 5:
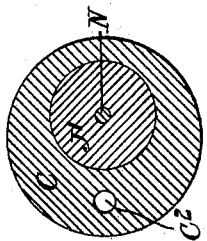
Figure 4:
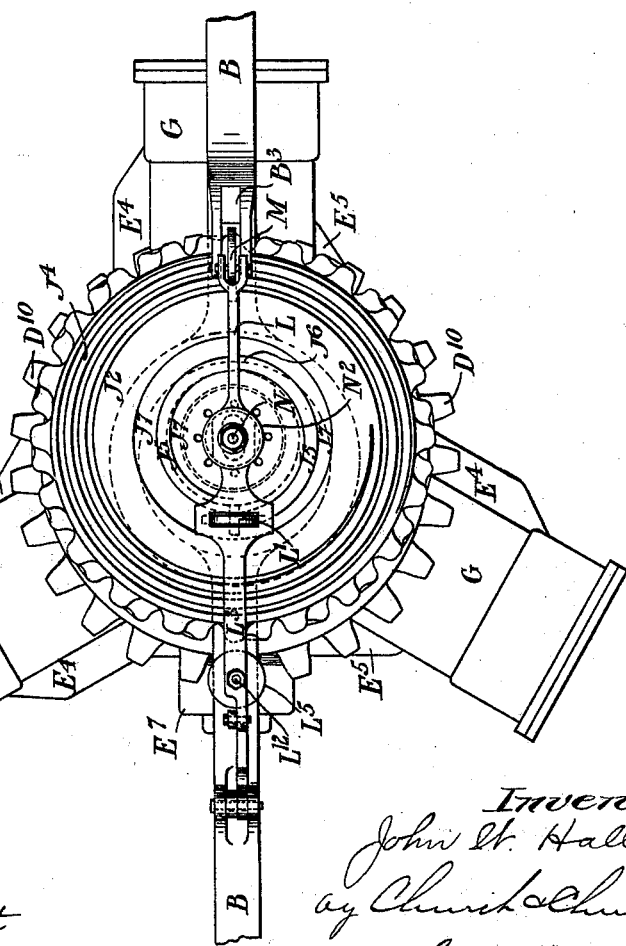
Figure 12:
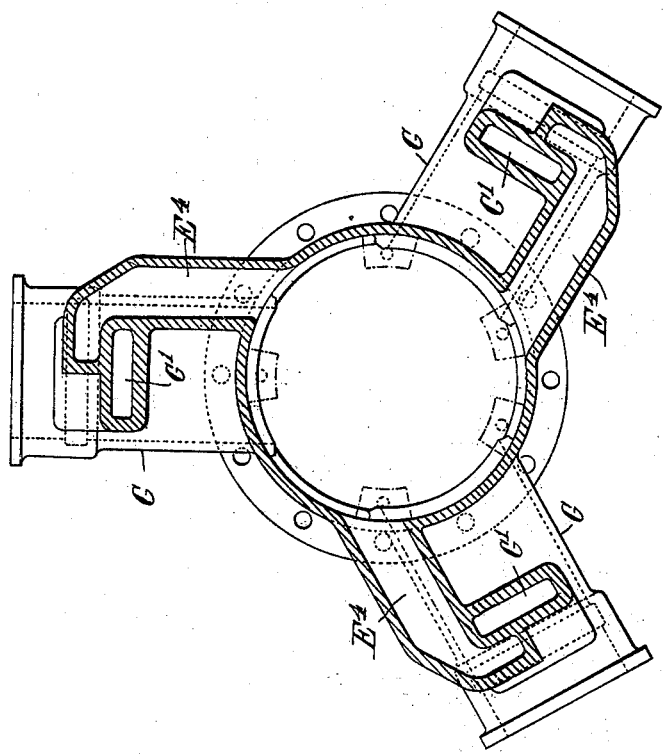
Figure 11:
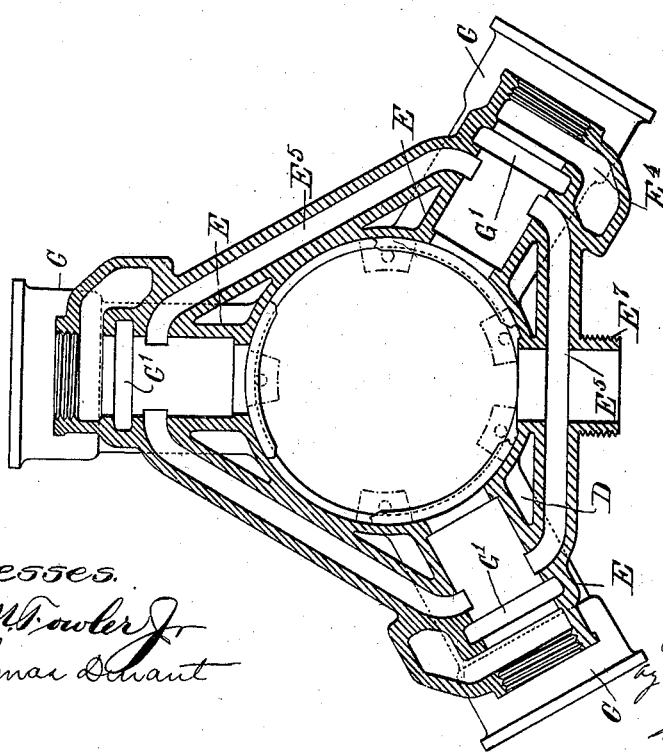
Figure 13:
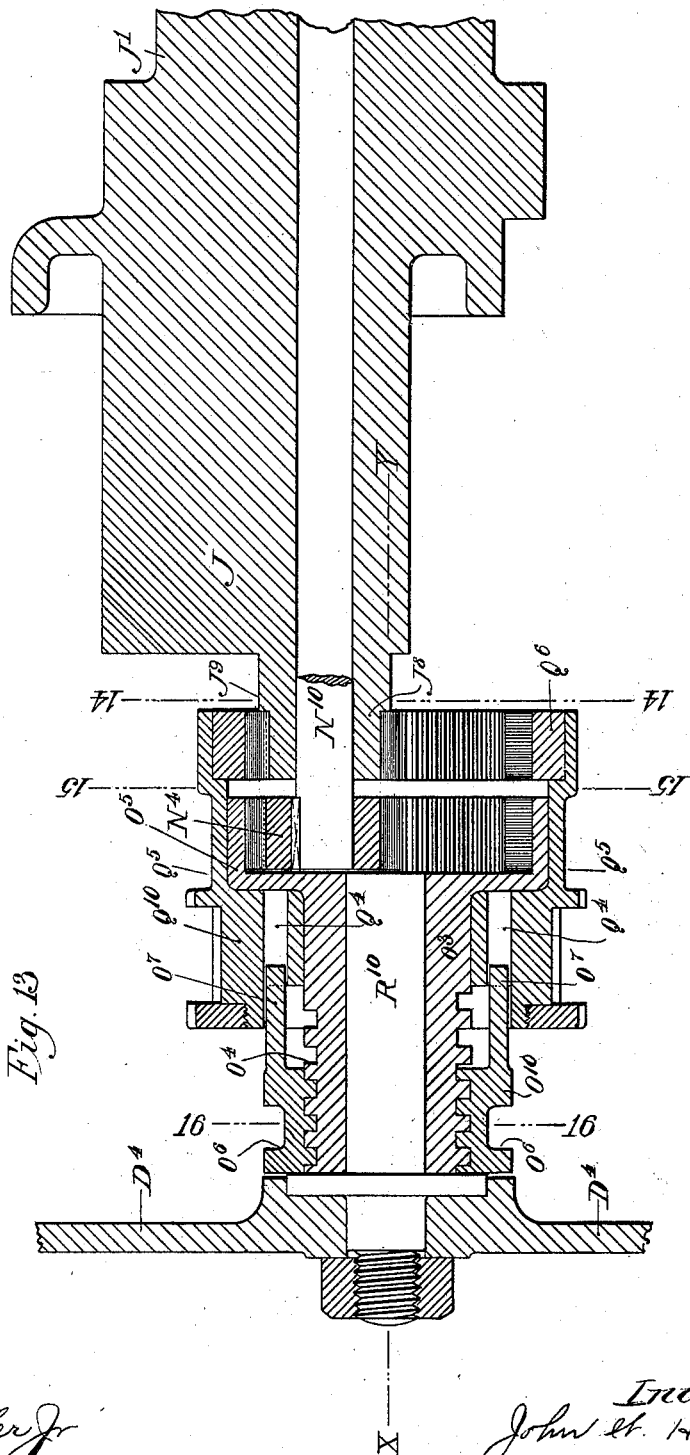
Figure 16:
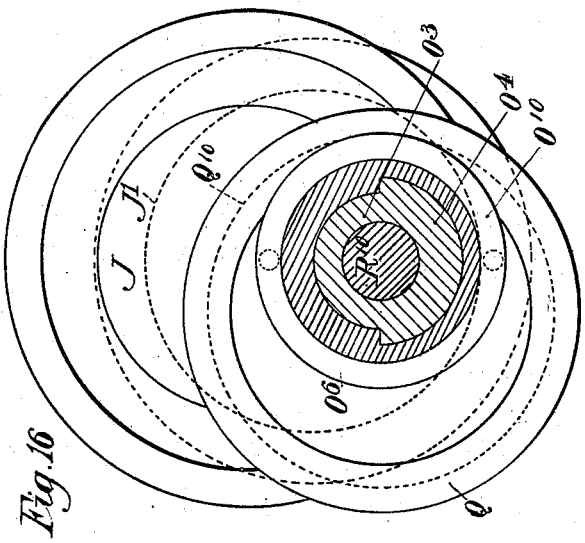
Figure 15:
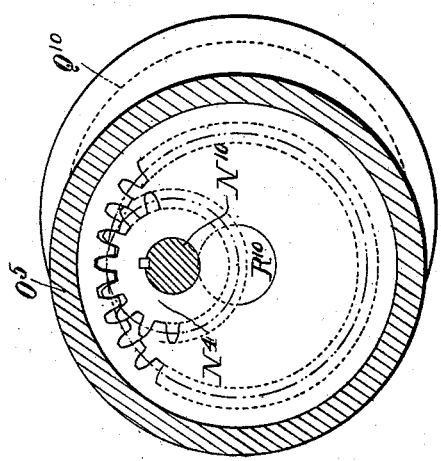
Figure 14:
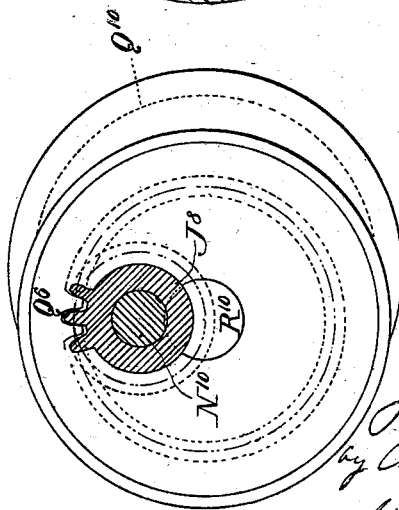
Figure 19:
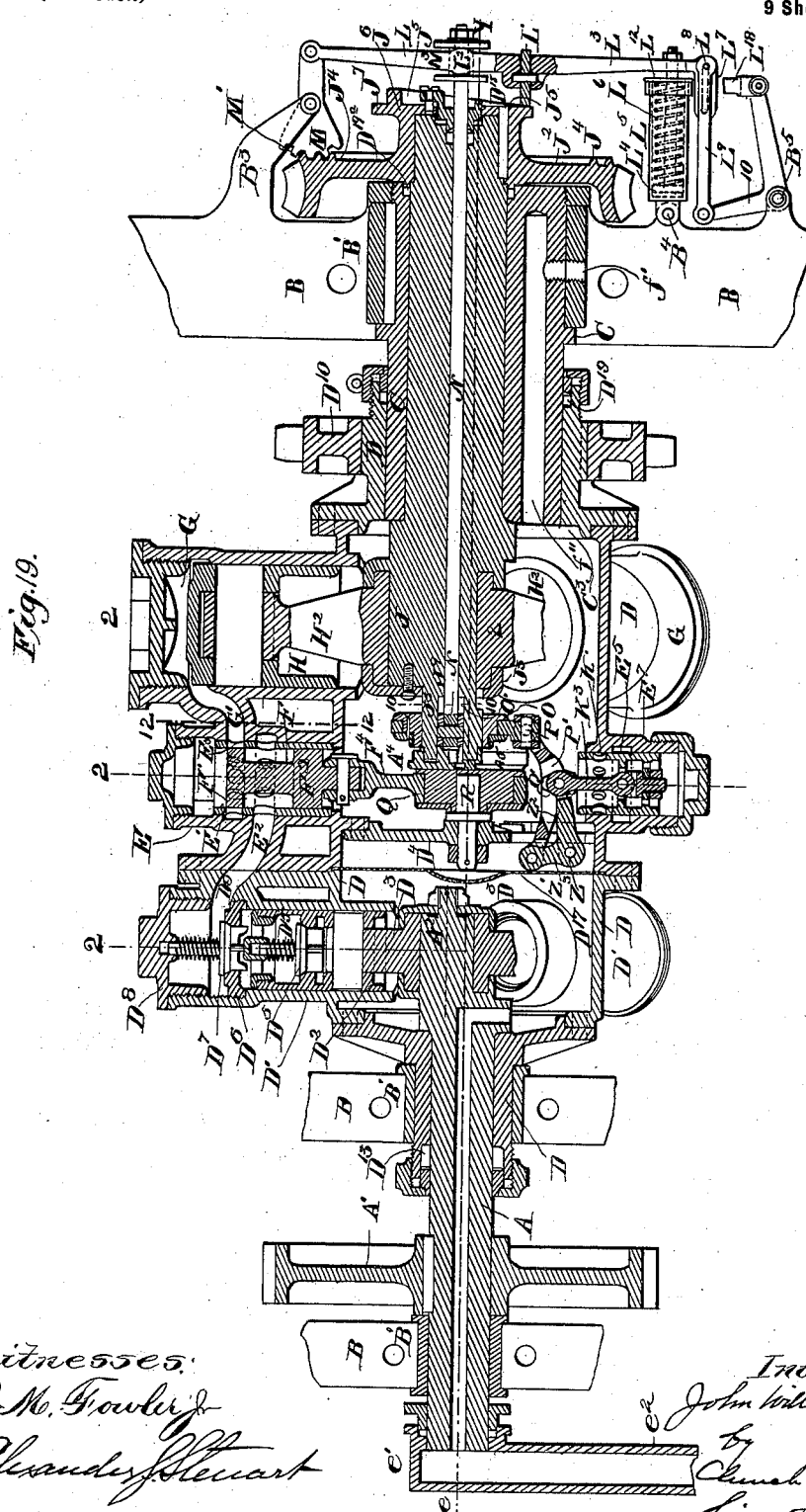

In the said drawings, Figure 1 is a plan in section, on the plane of the axis of rotation X Y, of one construction of apparatus according to this invention. Fig. 2 is a view of the same apparatus in section on the three transverse planes indicated by the lines 2 2 of Fig. 1. Fig. 3 is a section of a portion of Fig. 2 on the lines 3 3 of Fig. 2. Fig. 4 is an elevation of one end of the apparatus shown in Fig. 1. Fig. 5 is a transverse section of those parts of Fig. 1 which would be exposed by a section taken at the line 5 5 of Fig. 1. Fig. 6 is an elevation of the inner end of the crank-shank J' of Fig. 1. Fig. 7 is a similar view to Fig. 6, but with certain appurtenances of the crank-shaft added. Figs. 8, 9, and 10 are details of apparatus by which the angular advance of an eccentric-sheave forming part of Fig. 1 is controlled, Fig. 8 being a face view of the cap $J^3$ of the crank-pin J of Fig. 1 and Fig. 9 being a section on the line 9 9 of Fig. 10, Fig. 10 showing parts of the apparatus which become visible in a section taken on the line 10 10 of Fig. 1. Figs. 11 and 12 show the casting forming the body of Fig. 1 in section on the lines 11 11 and 12 12 of that figure. Fig. 13 is a longitudinal central section of part of an apparatus such as is shown in Fig. 1, comprising an alternative construction of control-gear for an eccentric-sheave Q and valve K, such as are shown in the said Fig. 1. Figs. 14, 15, and 16 are transverse sections on the lines 14 14, 15 15, and 16 16 of Fig. 13. Fig. 17 is a view similar to the left-hand portion of Fig. 1, showing a construction in which the throw of a crank operated by the prime mover can be altered while the apparatus is in motion, as hereinafter described, this construction being omitted from Fig. 1 to prevent confusion by multiplicity of parts and to enable the drawings to be presented on a larger scale. Fig. 18 is a detail of part of Fig. 17. Fig. 19 is a view similar to Fig. 1, except that it is slightly altered to enable the circulation of fluid, hereinafter referred to, to occur in a circuit which is partly external to the apparatus instead of wholly internal, as in Fig. 1.

Preliminarily it will be stated that this invention contemplates the use of a fluid-pressure-creating device having relatively movable members between which the pressure is created and both of which members are capable of angular movement. The driving power or prime mover is applied to one member and the driven part connected with the other member. Bearing this in mind, it will be at once understood that the movement of the prime mover may be communicated to the driven part without variation if the two members of the pressure-creating device are held in fixed relation to each other, as by a body of practically incompressible liquid confined between them, and, on the other hand, if the liquid is not confined then the movement of one of the members of the pressure-creating device, that connected with the prime mover, will not exert an appreciable torque on the other or second member. Consequently this second member may remain at rest. Now in order to impart to said second member a torque variable with respect to the power and speed of the prime mover, whereby the angular movement of the second member may range from nothing under the conditions last stated up to a maximum and with a power inversely proportioned to the speed, a mechanism is employed which may aptly be termed a "power and speed adjuster." The power and speed adjuster modifies the action of the liquid on the second or driven member of the pressure-creating device, whereby a complete movement or cycle of the first member may cause a coextensive angular movement, rotation, or cycle of the driven part or second member or a differential angular movement of the driven part or second member, as the case may be, and when, as in the embodiment to be now described, a differential movement of less speed may be attained the action of the liquid on the second member is prolonged, as is the utilization of the discharge from the driving member, during a relatively-greater movement of the latter to produce a lesser movement of the driven member, whereby the torque imparted to the second member will, while of greater moment, be correspondingly slower in time.

With reference first to Figs. 1 to 12, A is the driving-shaft, to which a motion of rotation of constant direction is imparted from a prime mover by the spur-wheel A', keyed thereon or otherwise. This shaft is supported by the frame B in bearings B', as also is the shaft C, the two shafts being in line. The shaft C is stationary and constitutes a fixed concentric bearing, as will hereinafter appear. A casing D, supported partly on the driving-shaft A, so as to encircle the latter within one of the bearings B', and partly supported on the shaft or bearing C, so that it can turn about both shafts, comprises a series of single-acting pump-cylinders D', in each of which is a piston $D^2$. The cylinders D' are three in number and are disposed radially at angles of one hundred and twenty degrees around the driving-shaft A, which latter is provided with a crank-pin $A^2$, engaged by the connecting-rods $D^3$ of each of the three pump-pistons $D^2$.

$D^4$ is a "spider" or five-armed frame which extends transversely across the casing D between the inner ends of the shafts A and C. In each piston $D^2$ is a non-return valve $D^5$, loaded lightly by a spring, and in a diaphragm $D^6$, extending across each pump-cylinder D' just beyond the outer limit of the travel of the piston, is a similar spring-loaded non-return valve $D^7$, the outer end of each cylinder being closed by a cover $D^8$ and the inner end being open to communicate with the interior of the casing D. From the outer end of each pump-cylinder a passage $D^9$, Fig. 1, leads into a valve-chamber E, into which is forced a cylindrical liner E', within which is a piston-valve F, operated by a valve-gear, as is hereinafter described. From the valve-chamber E the circulating fluid delivered into it by the pumps can return into the chamber in which the crank-pin $A^2$ revolves by either of two courses or by both these courses simultaneously. Ports $E^2$ are provided in the liner to admit the fluid delivered from the passages $D^9$ into the interior of the liner, whence it may pass below the upper piston F' of the piston-valve F through the upper ports $E^3$ in the liner into the adjacent power and speed adjuster cylinder G by way of the passages G', thence exhausting through the ports $E^3$ over the outer end of the piston F' and by way of exhaust-passages $E^4$, Fig. 12, leading from the outer end of each of the valve-chambers E back into the crank-chamber in which the crank-pin $A^2$ revolves. This is one of the two courses above referred to. The other course is by way of circulation-passages $E^5$ or their equivalent, Figs. 2 and 11, leading from each valve-chamber at points opposite the ports $E^2$ to the neighboring valve-chambers and connecting them all to the interior of a cylindrical shell $E^7$, formed on or in the casing D and communicating with the interior of that casing by way of a valve K, which is operated to vary the freedom of circulation of the fluid in a manner and by devices which will hereinafter be more particularly described. The valve K is a piston-valve provided with holes K' in its periphery, which are closed by the wall of the shell $E^7$ when the valve is in the position in which it is shown in Fig. 1, but which when the valve is lowered farther into the shell place the adjacent portion of the passage $E^5$ in communication with the interior of the casing D. The circulation-passages $E^5$ are in free communication with each other through the several valve-chests E and through the shell $E^7$, there being a clearance between the valve K and the shell at the part of the latter seen in section in Fig. 3.

Power and speed adjuster cylinders G, which in the present example are shown as having greater capacity than the pump-cylinders D', are attached to the casing D, as shown. They are three in number, like the pump-cylinders D', and each is disposed in line with its companion pump-cylinder, so that the three adjuster-cylinders are at equal angular distances apart around the axis of rotation X Y of the apparatus.

H are the adjuster-pistons.

$H^2$ are connection-rods which connect the adjuster-pistons H to a crank-pin J, as shown. Normally this crank-pin and shaft C are stationary; but the pin forms part of what will hereinafter be termed a "secondary shaft" J', journaled eccentrically within the said shaft C, which affords a long and rigid bearing therefor, in which it is adjustable, but in which it is normally prevented from rotating, as will hereinafter appear. The eccentricity of the secondary shaft J' relatively to the axis of the shaft C (which is also the axis of rotation of the apparatus) is such and the throw of the crank J is such relatively to the actual longitudinal axis of the secondary shaft J' that by rotating the secondary shaft J' within its long bearing in the shaft C the radial distance of the crank-pin J from the axis of rotation X Y—that is to say, its effective throw—can be varied from the maximum distance (at which it is shown in the drawings) to $nil$, the latter condition obtaining when the secondary shaft J' is so far rotated as to bring the axis of the crank-pin J into coincidence with the axis of rotation X Y.

$J^2$ is a worm-wheel fixed on the outer end of the secondary shaft J', so that by a suitable worm (not shown in the drawings) the latter can be rotated within the fixed shaft C, the worm-gearing serving also to prevent its accidental rotation.

$D^{10}$ is a chain-wheel keyed upon the casing D, so as to transmit to, say, the road-wheel of an autocar the rotary motion of the casing, set up as hereinafter explained.

It is intended that the part of the casing D which forms a crank-chamber for the crank-pins $A^2$ and J shall be filled with a circulating fluid—say oil—which fills also the pump-cylinders D', the passages $D^9$, the interior of the valve-chambers E between the pistons F' $F^2$ of the piston-valve, the outer ends of the adjuster-cylinders and valve-chest E, and the passages $E^4$ $E^5$, Fig. 2, and that by the rotation of the driving-shaft A the pump-pistons $D^2$ shall circulate this fluid from the crank-chamber containing the crank-pins $A^2$ J through one or both of the paths hereinbefore referred to into the crank-pin chamber again. It will be observed that the casing D, the adjuster and pump cylinders G D', and valve-chests E are rigidly connected together and that they, like the driving-shaft A, are rotatable relatively to the shaft C. They turn at one end (that through which the shaft A passes) in one of the bearings B' and at the other end on the shaft C.

$D^{13}$ $D^{18}$ $D^{19}$ $D^{19a}$ are working joints packed by means of stuffing-boxes or otherwise.

The casing D turns about the axis of rotation X Y; but the pistons H and connecting-rods $H^2$ rotate about another axis, which can be made eccentric thereto, in order that the adjuster-pistons shall have a variable reciprocatory movement relatively to the cylinders G, the amount of reciprocation being dependent upon the eccentricity of the crank-pin J to the axis of rotation X Y. Assuming that the valve K if employed in the shell $E^7$ is shut—$i. e.$, is in the position in which it is shown in Fig. 1—and that the crank-pin J is concentric with the axis of rotation X Y, rotation of the driving-shaft A would have the effect of rotating the casing D with an equal angular velocity and in the same direction, for the fluid in the apparatus could not be circulated, and therefore being practically incompressible would transmit the rotative effort of the crank-pin directly to the casing D through the connecting-rods $D^3$ and pistons $D^2$, and thence by way of the chain-wheel $D^{10}$ to the apparatus driven thereby; but if it be assumed that the valve K in the casing $E^7$ be so widely opened that communication between the outer ends of the several pump-cylinders D' and the interior of the casing D by way of the passages $E^5$ and shell $E^7$ be practically unimpeded (the crank-pin J still being concentric with the axis X Y) the rotation of the driving-shaft A would simply circulate the fluid from the casing D through the circulation-passages $E^5$ into the crank-chamber again, only exerting a trifling rotative effort upon the casing by the friction between the fluid and the passage of the casing. If, however, the crank-pin J be moved outward from the axis X Y and the valve K in the shell $E^7$ be shut, all the fluid from the casing D must pass from the cylinders D' back to that casing by way of the cylinders G and their passages E. In doing this it exerts a rotative effort upon the casing D, which depends upon the amount of eccentricity of the crank-pin J relatively to the axis X Y. If the eccentricity be a maximum, then the rotative effort will be a maximum also, for a given volume of fluid forced between the pistons H and covers of the adjuster-cylinders will produce a smaller angular movement of the casing D when the eccentricity of the pin J is a maximum than when it has a lesser eccentricity. If while the crank-pin is eccentric, as in the instance just considered, the valve K in the shell $E^7$ be opened, some of the circulating fluid instead of going into the adjuster-cylinders to effect the relative movement of those cylinders and their pistons will be "short-circuited" through the shell $E^7$ into the casing again, thus lessening the rotative effort upon the casing D in proportion to the amount of opening given by the valve K. That portion of the liquid which is engaged at any moment in transmitting a driving effort is contained within the passages $D^9$, $E^5$, and G' and the outer ends of the cylinders D' and G, and therefore does not come upon the packed working joints, as $D^{13}$ $D^{18}$ $D^{19}$ $D^{19a}$, which are the only working joints needing packing.

The valve K in the shell $E^7$ and the apparatus by which it is operated will now be described with reference to Figs. 1, 4, and 5.

The direction in which the casing D and cylinders D' G rotate about the axis X Y depends upon the position with regard to the crank-pin J of those of the cylinders G in which a driving effort is at any moment being exerted by their fluid contents—that is to say, if the resultant passing through the crank-pin J passes also through the axis of rotation X Y no rotation of the casing D will ensue; but if by shifting the crank-pin such resultant be diverted to one side or the other of the axis of rotation a turning effort tangential to the axis will be set up and rotation of the casing will occur in the direction in which such tangential effort is exerted on the casing, and as the resultant can be diverted as described by shifting the crank-pin J, which is movable, into and out of concentricity with the axis X Y and to one side or other of any radius extending from that axis the casing can be readily started, stopped, or reversed by suitably operating that crank-pin. The angular velocity imparted to the casing for a given speed of the driving-shaft A will depend (neglecting for the moment the amount of "slip" by way of the valve K) not only upon the radial distance of the crank-pin J from the axis of rotation X Y—that is to say, its effective throw—but also upon its adjustment to one side or the other of its neutral position—that is, the position in which it is concentric with the axis of rotation X Y—for if it be so set that the casing rotates in the same "sense" as that of the crank-pin $A^2$ of the shaft A the movement of the casing will virtually slow the action of the pump-pistons $D^2$, and consequently make the displacement of fluid into the cylinder G less than if the crank-pin J had been set to make the casing run in the opposite sense to that of the crank-pin $A^2$. From this it follows that with a given effective throw of the crank J the gear is more powerful when the casing and crank-shaft A rotate in the same sense than when they rotate in opposite senses.

It will here be advantageous to state the order in which the adjustments of the crank-pin J and valve K, if employed, are intended to be made and the results which ensue from such adjustments. Beginning with the valve K wide open and with the crank J concentric with the axis of rotation X Y there will be a maximum slip of fluid through the valve K and no circulation through the cylinders G, whose crank J will have no virtual throw. Consequently the casing D will remain at rest although the shaft A may be rotating at its normal speed. If now the crank-shaft J' be turned through half a revolution to bring the crank-pin J into the position of maximum eccentricity and the valve K be simultaneously moved to shut the communication between the circulation-passages $E^5$ and the interior of the casing D, the whole of the liquid displaced by the pump-pistons $D^2$ will pass through the cylinders G and cause the casing D to rotate at a moderate speed, inasmuch as the volume swept out by the pistons H is a maximum. If keeping the valve K shut the crank-pin J be turned onward through a further half-revolution, so that it ultimately arrives once more in a position of concentricity with the axis of rotation X Y, the speed of the casing D during the period of this further half-revolution will be gradually increased to the maximum, for the whole displacement of the pump-pistons $D^2$ is delivered, as under the circumstances set forth in the preceding paragraph, through the cylinders G, the pistons of which, however, sweep out per revolution of the casing a volume which becomes less and less as the crank-pin J recedes from its position of maximum eccentricity. That the volume swept out is so reduced and the speed increased will be obvious if it be remembered that when the crank-pin J has no eccentricity the pistons H will sweep out no volumes at all, and that under this condition the pump-pistons can deliver no fluid at all, so that the whole casing will revolve at its maximum velocity—i. e., that of the shaft A.

The direction in which the casing D rotates during the rotation of the crank-pin J through a complete revolution, as described, is intended to be the direction in which it drives the autocar or other driven device ahead.

To get the adjustments for driving backward or astern, the mechanism by which the movement of the crank-pin J and the valve K is correlated when correlating mechanism is employed should be so arranged that it is necessary to return the crank-pin J through the revolution to which reference has just been made and to start again with the crank-pin J concentric with the axis of rotation X Y. Rotation of the pin through the first half-revolution from that position should close the valve K, and thus enable the casing D to be driven by the fluid delivered into the cylinders G, in which, under the circumstances described, the volume swept out by the pistons H will be a maximum. By moving the crank-pin J onward beyond the half-revolution just referred to while keeping the valve K shut the speed of the casing will be made slightly faster by reason of the lessening of the ratio between the volume swept out by the adjuster-pistons and that swept out by the pump-pistons. It is desirable that further movement of the crank in the same direction, which would give a still further increase of speed in going astern, should be prevented where the apparatus is fitted to an autocar, for it is not considered judicious to enable such a vehicle to be driven backward at a high rate of speed. Moreover, when the apparatus is adjusted for going astern there comes a point at which the reaction between the pump-pistons and the pump-covers set up by the former and tending to rotate the casing D in a given direction is exactly balanced by a reaction between the pistons H and the covers of the cylinders G tending to rotate the casing in the opposite direction. Under these circumstances any effort exerted by the engine will tend to burst the casing and will not transmit any rotative effort to the driven device. This is another reason for limiting the "astern" adjustment of the crank, and this limit should be so established that the adjustment never proceeds beyond a point at which a certain minimum of rotative effort is transmitted from the casing to the part driven.

The apparatus by which the aforesaid correlation between the adjustment of the crank-pin J and that of the valve K is established will now be described, assuming primarily, for convenience of explanation, that the crank-pin J is made to become concentric with the axis of rotation X Y.

On one side of the worm-wheel J² is a spiral tooth J⁴, and on the boss of the worm-wheel is a spiral cam J⁵. This tooth and cam together control the valve K automatically by means of a lever L, which at one end is connected to a rocker M, pivoted to an extension B³ of the frame B and provided with teeth M′, gearing with the spiral tooth J⁴. The rocker M will be oscillated by rotation of the worm-wheel J².

L′ is a roller carried in the lever L at a point intermediate between that at which it is connected to the rocker M and its opposite end, by which it is connected to a manual control apparatus hereinafter described. The part L² of the lever L is forked or otherwise formed to engage the shaft N, arranged to slide endwise in a central bore of the shaft J′ and provided at its outer end with disks N′ N², between which the parts L² of the lever L are received, the disks being so arranged and proportioned that the shaft N, though always engaged with the lever L, is free to rotate with the shaft J′, so that such engagement is not affected by movement of the lever L in the direction of its own length. The endwise movement of the shaft N is normally automatically effected by the action of the cam J⁵ on the lever L through the roller L′, and the object of the spiral tooth J⁴ and rocker M is to move the lever endwise in such manner as to keep the roller L′ on the parts of the spiral cam J⁵ or of the face J⁷ of the boss J⁶ with which it is desired that it should coöperate in the different angular positions of the worm-wheel J² and of the crank-pin J, adjustable by the latter, there being, as will hereinafter appear, a special relationship between the cam J⁵ and the crank-pin J. The cam J⁵ is one which extends spirally through three hundred and sixty degrees, its face sloping gradually down from its highest point J⁶, Figs. 1 and 4, in opposite directions through one hundred and eighty degrees each way, to merge at each end into the flat face J⁷ of the portion of the worm-wheel J² on which it is placed. The highest point J⁶ of the cam J⁵ is in the present example situated, with regard to the axis of the shaft J′, on the same radial line as the crank-pin J, and as it is necessary that when the crank-pin J and axis of rotation are concentric the valve K should be wide open, the spiral tooth J⁴, cam J⁵, and rocker M so disposed in relation to each other that when the crank-pin is thus concentric the highest part J⁶ of the cam J⁵ comes against the roller L′, and consequently the lever L will have drawn the shaft N outward from the shaft J′ to one extreme of its travel, which corresponds, as will presently be shown, with the adjustment of the valve K into a position giving maximum opening. It is necessary to the obtainment of the variation in speed of the casing D, as hereinbefore described, that when the crank-pin J is moved out of the assumed position of concentricity in either direction from the assumed starting-point the valve K should be slowly closed during the first one hundred and eighty degrees of such movement, and should not thereafter commence to reopen, but should be kept closed through any continuation of such movement—say through a further one hundred and eighty degrees—in the same direction beyond the extent of one hundred and eighty degrees specified, and this result is insured by making the spiral cam merge into the flat face J⁷ of the boss of the worm-wheel J² at the end of each arc of one hundred and eighty degrees on either side of the highest portion J⁶ and by so arranging the spiral tooth J⁴ that it moves the lever L endwise to such extent that after causing the roller L′ to roll upon one or the other of the inclined portions of the cam during the first one hundred and eighty degrees of the movement of the latter from the point at which the part J⁶ and roller L′ bear against each other the roller is kept, in any continuation of such angular movement, upon the flat portion J⁷ of the worm-wheel J², from which the lever L and shaft N can obtain no movement. From the foregoing it will be evident that the valve K becomes quite closed upon completion of the first one hundred and eighty degrees movement of the cam, as aforesaid, and consequently the maximum pressure will be set up within the apparatus at a time when the crank-pin J is so situated that a maximum torsional effort is transmitted to the casing D by the fluids between the adjuster-pistons and the pump-pistons.

The means by which the inner end of the shaft N in Fig. 1 is enabled to operate the valve K will now be described.

From the inner end of the crank-pin J extends a pin J⁸, concentric with the shaft J′, and in this extension is a slot J⁹ to receive the central cross-bar O′ of a disk O, adapted to slide upon the extension J⁸ in the direction of the axial line thereof and keyed by a key N³ to the shaft N, by the endwise movement of which latter the disk can be caused to move along the extension J⁸. The disk O is concentric with the said extension and is encircled by a strap O² after the manner in which an eccentric-strap encircles an eccentric, this strap being coupled by a universal joint P to one end of a link P′, the other end of which is coupled to one arm Z′ of a bell-crank lever Z′ Z², pivoted at Z³ to the spider D⁴, the other arm Z² of which is coupled by a link K³ with the valve K. When the shaft N is moved endwise in the shaft J′, the disk O is moved endwise also and through the link P′ operates the bell-crank lever Z′ Z² to raise or lower the valve K. The disk O will have movement in its own plane relatively to the bell-crank lever Z' Z² during the rotation of the casing D, but owing to the length of the link P' such movement will not materially affect the adjustment given to the valve by the endwise movement of the disk, but will simply cause a slight reciprocatory movement of the valve, which will be of service in keeping it free from any possibility of sticking fast.

The end L³ of the lever L is connected to a piston L⁴, working in a cylinder L⁵, pivoted at B⁴ to the framing B' and closed at its outer end by a cover, between which cover and the piston L⁴ is a spring L⁶, operative to tend always to keep the roller L' close against the cam J⁶ or face J⁷ of the worm-wheel J².

L⁷ is a slotted arm forming part of the end L³ of the lever L and receiving a pin L⁸ in a link L⁹, arranged to be operated by a bell-crank lever L¹⁰, manually controlled, the pin L⁸ and slotted arm L⁷ being so arranged in relation to each other that while the link L⁹ can be caused to move the lever L in such a direction as to draw the shaft N outward, and thereby open the valve K to enable the casing D to stop rotating, the link L⁹ when released by the hand-gear will offer no obstacle to the movement of the lever L³ by the spring L⁶ into position to bring the roller L' into engagement with the proper portion of the cam J⁵ or face J⁷ of the worm-wheel J², nor will it offer any obstacle to the subsequent movement of the lever L by the cam. This restoration of the roller L' to the proper place on that portion of the boss of the worm-wheel on which it bears will occur even though the worm-wheel should have been adjusted between the removal of the roller from contact therewith and its return to place, for the lever L is always adjusted to the necessary extent by the rocker M whether the roller L' be in contact with the worm-wheel or not.

The rod L¹⁸, by which the bell-crank lever L¹⁰ is caused to actuate the lever L, can be connected to a brake-gear, if desired, so that the act of opening the valve K by the rod L¹⁸ results in a simultaneous application of the brake to the casing D or the apparatus driven thereby.

Into the shaft C extends a cylindrical cavity C', communicating by way of its inner end with the interior of the casing D and capable of being connected by the branch passage C² with a reservoir or pump. Within the cavity fits a hydraulically-packed piston C³, loaded by means of a spring C⁴ in compression between it and the closed end of the cavity. Any variation in the bulk of the oil contained in the casing D will be automatically compensated by the movement of the spring-loaded piston C³, so that no free space will occur within the casing upon contraction of the oil and no undue stress will be put upon the apparatus by its expansion. The apparatus may be charged with oil, or leakage may be made up through the passage C², through which oil can be forced into the apparatus past the packing of the piston C³.

If desired, the cavity C' may be maintained in communication with an accumulator.

The piston-valve F of Figs. 1 and 2, which are balanced, are each operatively connected by means of an eccentric-rod F⁴ with an eccentric-sheave Q.

The circulation which in the example hereinbefore referred to occurs in a circuit which is wholly internal might be differently arranged. For instance, the pumps might draw their supply from any convenient source through the pump crank-shaft and the adjuster might exhaust to any other point through the adjuster crank-shaft or bearing. Such an arrangement is indicated diagrammatically in Fig. 19, which resembles in its main features the construction illustrated in Fig. 1, except that the adjuster crank-shaft extends at its outer end into a stationary cap $e$, making a fluid-tight joint therewith by means of a stuffing-box $e'$, carried on the cap. A suction-pipe $e^2$ leads into the interior of the cap $e$ and the adjuster crank-shaft is made hollow, as shown, so that the pumps D' may draw their supply through this hollow member from the exterior of the apparatus by way of the pipe $e^2$. Across the interior of the casing D extends a diaphragm D¹⁷, which prevents any of the fluid delivered through the crank-pin A² from having access to the portion of the casing D in which the crank-pin J is situated, except by way of the pump-cylinders D', valve-chambers E, and exhaust-passages E⁴ or circulation-passages E⁵, Figs. 2 and 11.

The fluid delivered into that portion of the casing D in which the crank-pin J aforesaid is situated exhausts therefrom through a passage $f$, provided in the shaft or bearing C, which communicates with another passage $f'$, extending through one of the bearings B'. Fluid discharged through this passage $f'$ may pass into a tank, whence it is again drawn into the apparatus by way of the pipe $e^2$, so that the circulation of the fluid is continuous though partly external to the casing D.

It is necessary to have the eccentric-sheave Q so arranged and adjustable that although the crank-pin J, Fig. 1, has an angular and radial adjustment relatively to the axis of rotation X Y a line joining the center of the pin J with that axis shall always be at right angles to another line joining the axis of rotation with the center of the eccentric—$i.\ e.$, it is necessary to keep the angular advance of eccentric constant. This result is obtained in the example illustrated in Fig. 1, whereof the details are shown more clearly in Figs. 8, 9, and 10, by pivoting the eccentric-sheave Q eccentrically on a stud R, which is coaxial with the axis X Y, and fixing upon it guides, such as Q' Q², which intersect each other at the stud R, Fig. 1, at right angles and have upon the center line of one of them Q², Fig. 10, the center $Q^3$ of the sheave. In these guides are blocks $A^4$ $A^5$. The block $A^4$ is engaged by a pin $A^6$, Figs. 1 and 8, which projects from and is in line with the center of the crank-pin J, and the block $A^5$ is engaged by a similar pin $A^7$, this latter being at one end and the pin $A^6$ at the other end of a diameter of the dotted circle S, Fig. 8, in which circle the crank-pin J travels in its adjustment by the secondary shaft J'. When the crank-pin J (which in Figs. 1 and 8 is shown as having its maximum eccentricity) is turned to bring it nearer the axis X Y, the block $A^4$ travels along the guide Q' toward its intersection with the guide $Q^2$, along which the block $A^5$ travels. In this movement both blocks travel in the dotted circle S, and consequently by their action on the guides Q' $Q^2$ turn the same and the sheave Q about the stud R, Fig. 1, keeping the center $Q^3$, Fig. 10, of the sheave always (except when the crank has no virtual throw) ninety degrees in advance of a line S' drawn from the axis X Y to the crank-pin J and constituting the virtual throw of the crank. The virtual throw is zero when the crank-pin is concentric with the axis of rotation X Y.

The employment of two blocks $A^4$ $A^5$ and pins $A^6$ $A^7$ is necessitated by the fact that at certain points in its travel the pin $A^6$ may become concentric with the axis of rotation of the apparatus and also with the point of intersection of the two channels of the guides Q' $Q^2$, and if there were only this one pin the casing D in its rotation would under such circumstances turn the eccentric-sheave with it, and therefore the valve worked from the sheave would obtain no reciprocation, for they (the casing and the valves) would spin about the axis of rotation as one mass; but the provision of two blocks $A^4$ $A^5$, only one of which can at any time be concentric with the axis of rotation, obviates this difficulty. By moving the pin $A^6$ in the circle S from the position in which it is now shown to and past the axis of rotation, (at which the virtual throw of the crank-pin J disappears) it will be found that the eccentric, which, as now shown, has, say, positive advance, will change from positive to negative advance as in every alternate revolution in that circle at the moment when the pin $A^6$ passes the axial line. As it is not necessary that the rotation of the pins $A^6$ $A^7$ should be stopped at any particular point in the circle S, the device described could constitute an "all-round" reversing-gear applicable to many types of motor in addition to that to which its application is herein described; but in the present instance it is not so used, being employed solely as a reversing-gear—that is to say, being used only throughout a portion of its possible range—for, assuming the crank-pin J to be at the neutral point and ready for adjustment in the manner hereinbefore described, the eccentric is so set as to be on the opposite side of the axis of rotation to that at which the crank-shaft J' is situated, and consequently as soon as this pin $A^6$ moves out of coincidence with the axis of rotation X Y the eccentric will have become properly set for running the apparatus either ahead or astern, according as the movement of the pin $A^6$ is toward one side of the apparatus or the other; but as the crank-pin is always brought back to the neutral point after adjustment and never run beyond the "full-ahead" position into the "full-astern" position the reversing apparatus, being under control of the crank-pin, is similarly limited in its movement.

With reference now to Figs. 13 to 16, which, as aforesaid, illustrate an alternative construction of control-gear for the eccentric-sheave Q and valve K, the control-gear for the valve K comprises a sleeve $O^3$, rotatable on the stud R. This sleeve is externally screw-threaded, as at $O^4$, and provided at its opposite end with a flange $O^5$, internally toothed to gear with a pinion $N^4$, keyed on the end of the shaft $N^{10}$, which is made to be rotatable in the shaft J' of Fig. 1 instead of movable endwise therein. A nut $O^{10}$ encircles the screw-threaded portion $O^4$ of the sleeve $O^3$ and has a circular groove $O^6$ turned therein to receive one end of a lever, (say such as Z, Fig. 1,) which by the endwise movement of the nut O will be caused to operate the valve K. From the nut O extend two fingers $O^7$, adapted to slide in holes $Q^4$ in a casing $Q^5$, encircling the sleeve $O^3$ at the flanged end thereof. Although this casing is given under certain circumstances hereinafter explained with regard to the sheave $Q^{10}$ (corresponding to sheave Q, Fig. 1) a slight angular adjustment relatively to the stationary stud $R^{10}$, (corresponding to stud R, Fig. 1,) this angular movement may be disregarded and the casing can be considered as stationary in the explanation which follows of the mode of adjusting the valve K, as its movement is not of sufficient extent to materially affect such adjustment.

To adjust the valve K by the gear just described, the shaft $N^{10}$ is rotated to turn, by means of the pinion $N^4$, the sleeve $O^3$. Upon such rotation of the sleeve the nut $O^{10}$, which is prevented from rotating with the sleeve by the engagement of the fingers $O^7$ with the holes $Q^4$ in the circular casing $Q^5$, will be caused to travel endwise along the screw-threaded portion $O^4$ of the sleeve $Q^3$, so as to carry with it the end of any valve-adjusting lever engaged with the circular groove $O^6$ in the nut, and thus adjust the valve K.

With regard to the adjustment of the eccentric-sheave $Q^{10}$, which is integral with the casing $Q^5$, this is effected by means of a pinion $J^8$, fixed on the end of an extension $J^9$ from the crank-pin J, so as to be concentric with the axis of the crank-pin J'. This pinion engages with an internally-toothed ring $Q^6$, fixed in the circular casing $Q^5$. The diameter of the pinion $J^8$ on the pitch-line is one-half the pitch-line diameter of the internally-toothed ring $Q^6$, and it follows therefore that any point on the pitch-line of the pinion will describe a straight line relatively to the ring when the pinion and ring are rotated in gear with each other, and as it describes a straight line relatively to the ring it will also describe a straight line relatively to the sheave $Q^{10}$, which is integral with the ring. The pinion $J^8$ is so disposed that the axis of the crank-pin J passes through a point in the pitch-line thereof, and the ring $Q^6$ is concentric with the axis of rotation of the apparatus, so that adjustment of the crank-pin J by rotation of the shaft $J'$ will cause the casing $Q^5$ to turn about the stud $R^{10}$, and will cause the eccentric also to turn about that stud; but in this movement, owing to the relative dimensions and arrangement of the gears $J^8 Q^6$ being such as is described, the crank-pin J traverses relatively to a radius passing from the center of the eccentric $Q^{10}$ to the axis of rotation of the apparatus a straight-line path, maintaining a constant angle with the radius aforesaid and also intersecting the axis of rotation of the apparatus, so that the angular advance of the eccentric is constant despite the movement of both crank and eccentric relatively to the stud $R^{10}$ in their adjustment.

The crank-pin $A^2$ in apparatus such as is illustrated in Fig. 1 may be adjustable radially like the crank-pin J of Fig. 1. In such a case the adjustment of the crank-pin $A^2$ to make it concentric with the axis of rotation of the casing D would enable the driving parts—say the pistons $D^2$—to be stopped and the movement of the fluid contents of the apparatus to cease without stopping the prime mover. Such a construction is illustrated in Figs. 17 and 18, in which the driving-shaft A contains within it a crank-shaft $A^3$, of which the crank-pin $A^2$ forms part. The radial distance of the crank-pin from the axis of rotation of the driving-shaft A (indicated in Fig. 17 by the chain-lines X Y) is variable to vary the delivery of the pumps by varying the stroke of the pistons $D^2$, as will now be described. The shaft $A^3$ is placed eccentrically within the shaft A, the latter being bored to receive it. By rotating the crank-shaft $A^3$ within the driving-shaft A the crank-pin $A^2$ can be moved outward from the axial line X Y to the extreme position in which it is indicated in Fig. 17, or can be moved inward so as to become concentric with the axial line or to have any desired throw between such maximum and minimum. Normally the crank-pin $A^2$ is locked in the position in which it may happen at any moment to be by gearing which is adjustable to vary the throw of the crank-pin $A^2$, as desired. Preferably such gearing is of the type hereinafter described, and may be termed a "floating" gear—that is to say, a gear intermediate between a gear-wheel on the main driving-shaft A and another on the crank-shaft $A^3$, and so arranged that it normally transmits the motion of the gear-wheel on the driving-shaft A to that on the crank-shaft $A^3$ in such a way that both have equal angular velocity in the same direction; but should the axes of the floating gear be given adjustment relatively to each other they will alter the angular position of the gear-wheels on the shaft A $A^3$ relatively to each other, and thereby vary the setting of the crank-pin $A^2$. Such a gear is illustrated in Figs. 17 and 18, in which $A^6$ is a gear-wheel keyed on the shaft A and geared with a gear-wheel $A^{10}$, loose on the shaft A, by the intermediate wheels $A^7 A^8 A^9$. A ring of teeth $A^{11}$ on the part of the wheel $A^{10}$ gears with the pinion $A^{12}$, fixed to a shaft $A^{13}$, journaled in an arm $A^{14}$, fixed to the shaft A. The arm $A^{14}$ carries a worm $A^{17}$, Fig. 18, geared to the shaft $A^{13}$ by the gear-wheels $A^{15}$ $A^{16}$, and the worm $A^{17}$ gears with the worm-wheel $a$, keyed on the crank-shaft $A^3$. There may be other arrangements of gear for connecting the wheel $A^{10}$ with the worm-wheel $a$, the parts $A^{12} A^{13} A^{14} A^{15} A^{16} A^{17}$ being shown merely by way of example. $b\ b'$ are loose rings encircling the shaft A and are provided with pins $b^2$, upon which the two intermediate wheels $A^7 A^9$ are rotatable. The pins $b^2$ engage with the two casings $c\ c'$, which are concentric with the axis X Y and are rotatable about it, each being provided upon its exterior with a ring $c^2$ of teeth, by which both are geared to an adjusting-pinion $d$ on a shaft $d'$, which latter is provided with a hand-wheel $d^2$ and supported in the frame B. The operation of this gear will now be described. Normally the pinion $d$ prevents the rings $c^2$ from rotating, and therefore the pins $b^2$ and rings $b\ b'$ do not turn about the axis X Y and have no relative movement. This being so, the wheel $A^6$, rotating with the shaft A, imparts to the wheel $A^{10}$, through the idlers $A^7 A^8 A^9$, a motion which in direction and angular velocity is the same as its own. Inasmuch as the arm $A^{14}$ and all the gear carried by it are fixed to the shaft A it follows that under such circumstances the parts $A^6 A^{10} A^{14}$ will have no movement relatively to each other, and therefore that the shaft $A^3$ and crank-pin $A^2$ will not be adjusted by the worm $a$. In order to obtain such adjustment, it is necessary that the wheel $A^{10}$ should have movement relatively to the arm $A^{14}$ and shaft A in order to rotate the pinion $A^{12}$ and the worm-gearing controlled thereby. Such rotation of the wheel $A^{10}$ relatively to the wheel $A^6$ may be effected as follows, whether the apparatus be at rest or in motion: The shaft $d'$ is rotated and by means of the pinion $d$ gives the rings $c^2$ motion in opposite directions, which has the effect of giving the pins $b^2$ angular movement with the casing $c\ c'$ about the axis X Y relatively to each other, and they cannot be moved relatively to each other without altering the angular position of the wheel $A^{10}$ in relation to the wheel $A^6$ and arm $A^{14}$. When the wheel $A^{10}$ is thus moved relatively to the arm $A^{14}$, it operates the gear-wheel $A^{12}$ and this, through the worm-wheel $a$, rotates the shaft $A^3$ within the shaft A, thereby varying the throw of the crank-pin A², as aforesaid. The crank-pin A² may, however, be adjusted radially by devices other than those hereinbefore described.

Obviously this invention is not limited to the use of any particular form of pumping mechanism or pressure-creating device, such as a pump, or to any particular form of adjuster or pressure-utilizing mechanism or the use of an inelastic fluid, inasmuch as many well-known forms of such mechanism might be combined for use in accordance with this invention, and where an elastic fluid is employed the usual provisions will be made for varying the expansion of the same in order to vary the power and speed of the driven parts with relation to the driving parts. The number of pumping cylinders or mechanisms and the corresponding adjuster parts is also capable of wide variation both in the relative numbers employed and in the whole number employed. So, too, it is obvious that the relation of the parts may be reversed and the power or driven member in the present instance become the driving member and the driving member the driven member.

In carrying the invention into effect it will be observed that between the driving member and the driven member—to wit, the shaft A and the wheel D¹⁰ in Fig. 1—there is interposed a pump, and it will be noted that I contemplate the use of any well-known form of fluid-pressure-creating device having two elements or more which coöperate in producing the fluid-pressure, such pressure being produced by the relative movements of the elements constituting the pressure-creating device. Thus, for example, in Fig. 1 the piston of the pump constitutes one of the elements and the casing the other element, and in the broad use of the terms it will be noted that I include any device for creating pressure between them by the relative movements of the parts, so as to transmit power from one of the parts to the other and so tending, in connection with suitable conduits, ducts, or openings communicating with the space between the elements, to create a circulating system of the fluid employed in the device. The by-pass, including the valve K, and particularly the mechanism for securing the correlation of the parts, while highly desirable in the most approved form of the apparatus may nevertheless be omitted in some instances, especially if provision be made to at will uncouple the connection between the prime mover and the pressure-creating device, so as to allow the former to run independently.

I claim—

1. In a power-transmitting device, the combination with a driving member and a driven member, of a pressure-creating device, such as a pump, having one of its elements connected with the driven member and its coöperating element connected with the driving member, and an adjuster actuated by the pressure-creating device or pump and controlling the movement of the driven member, with means for varying the relative capacities of the pressure-creating device or pump and the adjuster.

2. In a power-transmitting mechanism, the combination with a driving member and a driven member, of a fluid-pressure-creating device, such as a pump, one element of which is operatively connected with the driving member and the coöperative element of which is movable and connected with the driven member, and a fluid-pressure adjuster, the parts of which are relatively adjustable to vary its mechanical advantage and possessing an element operatively connected to and movable in unison with the said coöperating element of the pressure-creating device, whereby a given torque set up by the driving member can be transformed into torque of different values exerted upon the driven member by the joint action of the pressure-creating device and adjuster and the body of working fluid within them; substantially as described.

3. In a power-transmitting mechanism, the combination with a driving and a driven member, of a fluid-pressure-creating device, such as a pump, one element of which is operatively connected with the driving member and the other element of which is movable and connected with the driven member, a fluid-pressure adjuster, the parts of which are relatively adjustable to vary its action and possessing an element operatively connected to and movable in unison with the said coöperating element of the fluid-pressure-creating device and a by-pass for opening communication between the discharge of the pressure-creating device or pump and the suction-chamber thereof; substantially as described.

4. In a power-transmitting mechanism, the combination with the driven member and the driving member, of a fluid-pressure-creating device, such as a pump, one element of which is operatively connected with the driving member and the coöperating element of which is movable and connected with the driven member, a fluid-pressure adjuster, the parts of which are relatively adjustable to vary its action, and possessing an element operatively connected to and movable in unison with the said coöperating element of the pump, a by-pass for opening communication between the pump-discharge and pump-suction chamber, and means operatively connected with the adjustable member of the adjuster for controlling the by-pass.

5. In a power-transmitting mechanism, the combination with a driving member and a driven member, of a fluid-pressure-creating device, such as a pump, one element of which is operatively connected with the driving member and the coöperating element of which is movable and connected with the driven member, a fluid-pressure adjuster having two coöperating elements one of its elements being connected with the driven member, a relatively-fixed but adjustable crank-shaft with which the other element of the adjuster is operatively connected and a duct or ducts connecting the pump and adjuster; substantially as described.

6. In a power-transmitting mechanism, the combination with a driving member and a driven member, of a fluid-pressure-creating device, such as a pump, one element of which is operatively connected to the driving member and the coöperating element of which is movable and connected with the driven member, a fluid-pressure adjuster having two coöperating elements one of its elements being connected with the driven member, a relatively-fixed but adjustably-movable crankshaft with which the other element of the adjuster is operatively connected, a duct extending from the pump to the adjuster and a by-pass between the pump-discharge and the pump-suction chamber for diverting discharge fluid from the pump away from the adjuster and into the suction-chamber; substantially as described.

7. In a power-transmitting mechanism, the combination with a driving member and a driven member, of a fluid-pressure-creating device such as a pump, one element of which is operatively connected with the driving member and the coöperating member of which is movable and connected with the driven member, a fluid-pressure adjuster having two coöperating elements, one of its elements being connected with the driven member, a relatively-fixed but adjustably-movable crank-shaft with which the other element of the adjuster is operatively connected, a duct extending from the pump to the adjuster, a by-pass between the pump-discharge and the pump-suction chamber and a controlling-valve for said by-pass, whereby the discharge from the pump may be diverted in variable proportion through the adjuster and into the suction-chambers; substantially as described.

8. In a power-transmitting mechanism, the combination with a driving member and a driven member, of a fluid-pressure-creating device, such as a pump, one element of which is operatively connected with the driving member and the coöperating element of which is movable and connected with the driven member, a fluid-pressure adjuster having one of its elements connected with the driven member, a coöperating element of the adjuster, a relatively-fixed but adjustable crankshaft, with which the said coöperating element of the adjuster is operatively connected, a duct extending from the pump to the adjuster a by-pass affording communication between the pump-discharge and pump-suction chamber, a by-pass valve and an operative connection between the adjustable crankshaft and valve to correlate the adjustments of the two, whereby the discharge fluid of the pump may be diverted in variable proportions through the adjuster and into the suction-chamber; substantially as described.

9. In a power-transmitting mechanism, the combination of a pump-piston, a cylinder therefor, adjuster-cylinder and piston therefor, a shell having a conduit connecting the cylinders and rotating around a given axis, a fluid-power-transmitting agent in said cylinders and conduit whereby the driving-piston drives the liquid and by liquid-pressure exerts force against the shell to turn it, the traverse of one of said pistons being adjustable to vary the movement of the liquid; substantially as described.

10. In a power-transmitting mechanism, the combination of a plurality of companion driving-pistons and a separate cylinder for each, all connected to rotate in unison, a plurality of separate adjuster-cylinders rotating in unison with the pump-cylinders, a piston for each, and conduits extending from the driving-cylinders to the adjuster-cylinders; substantially as described.

11. In a power-transmitting mechanism, the combination of a plurality of companion driving-pistons and a separate cylinder for each, all connected to rotate in unison, a plurality of separate adjuster-cylinders rotating in unison with the pump-cylinders, a piston for each, conduits extending from the driving-cylinders to the adjuster-cylinders, and a distribution-valve for each adjuster-cylinder; substantially as described.

12. In a power-transmitting mechanism, in which the power-transmitting agent is a fluid, the combination with a series of reciprocatory driving-pistons and cylinders therefor and a series of reciprocatory adjuster-pistons and cylinders therefor, of a single rotary shell integral with and connecting all of said cylinders, and having ducts connecting said cylinders; substantially as described.

13. In a power-transmitting mechanism in which the power-transmitting agent is a fluid, the combination with the reciprocatory driving-piston and a reciprocatory adjuster-piston and cylinders for said pistons, of a single rotary shell integral with and connecting the cylinders of said pistons, ducts in said shell for the passage of the fluid between said pistons and a distribution-valve for controlling the passage of fluid through the adjuster cylinders; substantially as described.

14. In a power-transmitting apparatus, the combination with a rotary driving member, a rotary driven member and a pump operated by the rotary driving member, of an adjuster communicating with the pump and having one of its elements connected with the driven member, an adjustable crank-shaft with which the coöperating element of the adjuster is connected, a valve controlling the passage of fluid from the pump to the adjuster, an eccentric controlling the operation of said valve, and a connection between the said crank-shaft and eccentric, whereby the lead of the valve is maintained; substantially as described.

15. In a power-transmitting mechanism, the combination with a crank driving-shaft, a floating gear interposed between the driving-shaft and the prime mover for varying the effective throw of the crank without interfering with its rotation, a driven member and a relatively-fixed crank-shaft, of a pump and a power and speed adjuster, one of the elements of the pump and adjuster being connected together and with the driven member, the coöperating element of the adjuster being connected with the relatively-fixed crank and the coöperating element of the pump being connected with the adjustable crank of the driving-shaft; substantially as described.

16. In a power-transmitting apparatus, the combination with a primary driving-shaft, and a secondary driving-shaft, $A^3$, having a crank thereon, the gear-wheels $A^6$, $A^{10}$ interposed between and operatively connected to the primary and secondary driving-shafts and an intermediate floating gearing connecting the wheels $A^6$, $A^{10}$, whereby the normal motion of the wheel, $A^6$ is reproduced by the wheel $A^{10}$ but by the relative movement of the floating gearing, the relative adjustment of angular position of the wheels $A^6$, $A^{10}$, and the throw of the crank may be varied, and means for controlling the floating gearing.

17. In a power-transmitting apparatus, the combination of a driving-shaft, a crank-shaft eccentrically mounted thereon with gear-wheels operatively connected with said driving-shaft and crank-shaft and a floating gear connecting said gear-wheels, comprising an intermediate gear, a divided support $c\ c'$, and adjusting apparatus $d$, $d^2$, for varying the angular adjustment of the gear-wheels connected with the driving-shaft and crank-shaft whereby the throw of the crank may be varied.

18. In a power-transmitting apparatus, the combination with a cranked driving-shaft, a driven member and a relatively-fixed crank-shaft, of a rotary casing having pump and adjuster cylinders therein and connected with the driven member, of a circulating system including the pump, adjuster-cylinders and center of the casing, pump and adjuster pistons connected respectively with the relatively-fixed and driving cranks, whereby the working packed joints for retaining the fluid within the casing are not subjected to pressure.

19. In a power-transmitting apparatus, the combination with the driving and driven members arranged to rotate in axial alinement, a rotary casing connected with one of said members and arranged to rotate in a coincident axial line with packings for preventing the escape of fluid at the working joints, of a pump arranged in said casing adapted to draw its supply from the center thereof, a power and speed adjuster arranged within said casing and in communication with the pump, the delivery from said adjuster being to the center of the casing whereby the pressure on the packed joints is relieved.

20. In a power-transmitting apparatus, the combination with a driving member, a pump operated thereby, a power and speed adjuster, and an adjustable crank with which one of the elements of the adjuster is connected, of a system of ducts connecting the pump and adjuster, a valve for relieving pressure in the adjuster and an operating mechanism for said valve controlled by the movement of the said crank, whereby the production of a bursting pressure in the adjuster by the adjustment of the crank is prevented by the opening of the valve; substantially as described.

21. In a power-transmitting apparatus, a driving member, a driven member, a pump and a power and speed adjuster, having one of their elements connected for unitary motion and also connected with the driven member, a connection between the coöperating elements of the pump and driving member and an adjustable crank with which the coöperating element of the adjuster is connected, of a valve for diverting the fluid passing from the pump to the adjuster and an operating mechanism for said valve controlled by the movement of the adjustable crank; substantially as described.

22. In a power-transmitting apparatus, the combination with a driving member, a driven member, and a pump and power and speed adjuster connected for unitary movement and connected with the driven member, the coöperating element of the pump being connected with the driving member, and an adjustable crank-shaft with which the coöperating element of the adjuster is connected, of a valve for diverting part of the fluid passing from the pump to the adjuster into or out of the chamber whence the pump draws its supply, and an operating-rod for said valve passing through the said adjustable crank; substantially as described.

23. In a power-transmitting apparatus, the combination with a driving member, a driven member and a casing, all arranged in coincident axial alinement, a pump and a power and speed adjuster in said casing, a connection between one of the pump elements and driving member, an adjustable crank and a connection between one of the adjuster elements and adjustable crank, of a valve controlling the passage of fluid from the pump to the adjuster, an eccentric for operating said valve and a connection between said eccentric and the said adjuster-crank; substantially as described.

24. In a power-transmitting apparatus, the combination with a driving member, a driven member and a casing, all arranged in coincident axial alinement, a pump and a power and speed adjuster in said casing, a connection between one of the pump elements and driving member, an adjustable crank and a connection between one of the adjuster elements and adjustable crank, of a valve controlling the passage of fluid from the pump to the adjuster, an eccentric for operating said valve, a second valve for diverting fluid from the adjuster and an operating mechanism for said second valve controlled by the movement of the adjustable crank.

25. In a power-transmitting apparatus, the combination with a driving member, a driven member and a casing, all arranged in coincident axial alinement, a pump and a power and speed adjuster in said casing, a connection between one of the pump elements and driving member, an adjustable crank and a connection between one of the adjuster elements and adjustable crank, of a valve controlling the passage of fluid from the pump to the adjuster, an eccentric for operating said valve, a connection between said eccentric and adjustable crank, a second valve for diverting fluid-pressure from the adjuster and an operating mechanism for said second valve controlled by the movement of the adjustable crank.

26. In a power-transmitting apparatus, the combination with the cranked driving-shaft, a rotary driven member, a casing connected with the latter, a pump in said casing having its piston connected with the driving-shaft crank, an adjuster in said casing embodying a piston, an adjustable crank connected with the adjuster-piston, and fluid-circulating passages connecting the pump and adjuster and the center of the casing, of a valve controlling the passage of fluid from the pump to the adjuster, an eccentric for operating said valve, connections between said eccentric and the adjuster-crank, a second valve for diverting fluid from the adjuster to the center of the casing and an operating mechanism for said second valve.

27. In a power-transmitting apparatus, the combination with a driving member, and a pump operated thereby, of a driven member, a power and speed adjuster for the driven member operated by fluid from the pump, a valve for diverting from the pump through a by-pass some of the pump-discharge which would otherwise go to the adjuster, a rotary shaft controlling by its angular adjustment the effective power exerted by the adjuster and a valve-operating mechanism embodying a spiral incline moving in unison with the adjuster-shaft and a lever coöperating with said incline to move the valve and means for maintaining said lever in its operative relation to the spiral incline; substantially as described.

28. In a power-transmitting apparatus, the combination with a pump and a power and speed adjuster, an adjustable crank-shaft with which said adjuster coöperates in developing its power and a valve for diverting from the pump through a by-pass some of the pump-discharge which would otherwise go to the adjuster, of a valve-operating mechanism embodying an incline carried by the said adjustable crank-shaft, a lever L and the connection between said lever L and the adjuster-shaft for maintaining the lever in position for coöperation with the incline; substantially as described.

29. In a power-transmitting mechanism, the combination with a driving and a driven member, of a fluid-pressure-creating device, such as a pump, one element of which is operatively connected with the driving member, and the coöperating element of which is movable and connected with the driven member, a fluid-pressure power and speed adjuster having one of its elements also connected with the driven member, a coöperating element of the adjuster, a relatively-fixed but adjustable crank-shaft with which that coöperating element of the adjuster is operatively connected, discharge-ducts extending from the pump to the adjuster and comprising a by-pass affording communication between the pump-discharge and the pump-suction chamber to divert the discharge fluid of the pump in variable proportions through the adjuster and into the suction-chamber through these ducts, a by-pass valve, a valve-operating rod N extending to the exterior of the casing through the adjustable crank-shaft, and an operative connection between the rod N and the adjustable crank-shaft; substantially as described.

30. In a power-transmitting mechanism, the combination with a driving and a driven member, of a fluid-pressure-creating device, such as a pump, one element of which is operatively connected with the driving member and the coöperating element of which is movable and connected with the driven member, a fluid-pressure power and speed adjuster having one of its elements connected with the driven member, a coöperating element of the adjuster, a relatively-fixed but adjustable adjuster crank-shaft with which said coöperating element of the adjuster is operatively connected, discharge-ducts extending from the pump, to the adjuster and comprising a by-pass affording communication between the pump-discharge and pump-suction chamber, a valve controlling the by-pass to divert the discharge fluid of the pump in variable proportions through the adjuster and into the suction-chamber, a valve-operating rod N extending to the exterior of the casing through the adjustable crank-shaft, a ring and a slider O on which the ring can turn constituting an operative connection between the by-pass valve and the rod N; substantially as described.

31. In a power-transmitting mechanism, the combination with a driving and a driven member, of a fluid-pressure-creating device, such as a pump, one element of which is operatively connected with the driving member and the coöperating element of which is movable and connected with the driven member, a fluid-pressure power and speed adjuster having one of its elements connected with the driven member, a coöperating element of the adjuster, a relatively-fixed but adjustable crank-shaft with which said coöperating element of the adjuster is operatively connected, discharge-ducts extending from the pump to the adjuster and comprising a by-pass duct affording communication between the pump-discharge and the pump-suction chamber, a by-pass valve controlling the duct to divert the discharge fluid of the pump in variable proportions through the adjuster and into the suction-chamber through those ducts, a valve-operating rod N extending to the exterior of the casing through the adjustable crank-shaft, a ring, a slider O on which the ring can turn constituting an operative connection between the by-pass valve and the rod N, a lever connected with the rod N, a disk with a spiral incline $J^5$ upon it to operate the lever and means for maintaining said lever in its operative relation to the spiral incline; substantially as described.

32. In a power-transmitting mechanism, the combination with a driving and a driven member, of a fluid-pressure-creating device, such as a pump, one element of which is operatively connected with the driving member and a coöperating element of which is movable and connected with the driven member, a fluid-pressure power and speed adjuster having one of its elements connected with the driven member, a coöperating element of the adjuster, a relatively-fixed but adjustable adjuster crank-shaft with which said coöperating element of the adjuster is operatively connected, discharge-ducts extending from the pump to the adjuster and comprising a by-pass duct affording communication between the pump-discharge and the pump-suction chamber, a by-pass valve to divert the discharge fluid of the pump in variable proportions through the adjuster and into the suction-chamber through said ducts, a valve-operating rod N extending to the exterior of the casing through the adjustable crank-shaft, a ring, a slider O on which the ring can turn constituting an operative connection between the by-pass valve and the rod N, a lever connected with the rod N, a loaded pressure-producing device which acts upon that lever, a disk with a spiral incline $J^5$ upon it to operate the lever, and means for maintaining said lever in its operative relation to the spiral incline; substantially as described.

33. In a power-transmitting mechanism, the combination with a driving and a driven member, of a fluid-pressure-creating device, such as a pump, one element of which is operatively connected with the driving member and a coöperating element of which is movable and connected with the driven member, a fluid-pressure power and speed adjuster having one of its elements connected with the driven member, a coöperating element of the adjuster, a relatively-fixed but adjustable crank-shaft with which that coöperating element of the adjuster is connected, a valve controlling the distribution of motive fluid through the adjuster-cylinder, an eccentric controlling the operation of said valve, a pivot-pin on which the eccentric is rotatable, and a connection between the adjuster crank-shaft and the eccentric whereby the angular advance of the eccentric is maintained constant in relation to the virtual crank of the adjuster; substantially as described.

34. In a power-transmitting mechanism, the combination with a driving and a driven member, of a fluid-pressure-creating device, such as a pump, one element of which is operatively connected with the driving member and the coöperating element of which is movable and connected with the driven member, a fluid-pressure power and speed adjuster having one of its elements connected with the driven member, a coöperating element of the adjuster, a relatively-fixed but adjustable crank-shaft with which that coöperating element of the adjuster is connected, a discharge-duct extending from the pump to the adjuster, a by-pass valve controlling a by-pass from that discharge-duct, and a chamber in which the working fluid is subjected to the thrust by which the mechanism is operated constituted by the opposed parts of the coöperating elements of the pump and of the adjuster, the discharge-duct and the by-pass valve whereby the portion of working fluid which at any moment actually transmits the working thrust is prevented from having access to stuffing-boxes opening on the exterior of the apparatus and therefore from exerting working pressure thereon and producing leakage.

35. In a variable power-transmitting mechanism, the combination with a driving and a driven member, of a fluid-pressure-creating device, such as a pump, one element of which is operatively connected with the driving member, and the coöperating element of which is movable and connected with the driven member, a fluid-pressure power and speed adjuster having one of its elements connected with the driven member, a coöperating element of the adjuster, a relatively-fixed but adjustable crank-shaft with which that coöperating element of the adjuster is connected, a valve controlling the distribution of motive fluid to an adjuster-cylinder, an eccentric controlling the operation of said valve, a pivot-pin on which the eccentric is rotatable, a hypocycloidal gear constituting an operative connection between the adjuster crank-shaft and the eccentric, whereby the angular advance of the eccentric is maintained constant in relation to the "virtual crank" of the adjuster; substantially as described.

36. In a power-transmitting mechanism, the combination with a driving and a driven member, of a fluid-pressure-creating device, such as a pump, the parts of which are relatively adjustable to vary its mechanical advantage, and a floating gear connecting one element of the pump with the driving member and comprising a gear-wheel connected with that element and another connected with the driving member, a two-part rotatable support $c, c'$, an intermediate gear-train $A^7 A^8 A^9$, carried partly on each division of the support, adjusting apparatus for varying the angular adjustment of the support divisions and said element and driving member in relation to each other and to the member A⁸ of the train; substantially as described.

37. In a power-transmitting mechanism, the combination with a driving and a driven member, of a fluid-pressure-creating device, such as a pump, one element of the pump operatively connected with the driving member, a coöperating element of the pump rotatable and connected with the driven member, a fluid-pressure power and speed adjuster, having one of its elements connected with the driven member, a coöperating element of the adjuster, a relatively-fixed but adjustable crank-shaft with which that coöperating element of the adjuster is operatively connected, discharge-ducts extending from the pump to the adjuster and comprising a by-pass duct affording communication between the pump-discharge and the pump-suction chamber, a valve to divert the discharge fluid of the pump in variable proportions through the adjuster and into the suction-chamber, through those ducts, a ring, a slider O on which the ring can turn, constituting an operative connection between the by-pass valve and a valve-operating rod N extending to the exterior of the casing through the adjustable crank with which also it is operatively connected, a lever connected with the valve-operating rod N, a disk with a spiral incline J⁵ upon it to operate the lever, and means for maintaining said lever in its operative relation to the spiral incline, a valve controlling the distribution of the motive fluid for an adjuster-cylinder, an eccentric controlling the operation of said valve, a pivot-pin upon which the eccentric is rotatable, and a connection between the adjuster crank-shaft and that eccentric, whereby the angular advance of the eccentric is maintained constant in relation to the adjustable "virtual-crank" arm of the adjuster; substantially as described.

38. In a power-transmitting mechanism, the combination with a driving and a driven member, of a fluid-pressure-creating device such as a pump the parts of which are relatively adjustable to vary its mechanical advantage, a floating gear connecting one element of the pump with the driving member and comprising a gear-wheel connected with that element and another connected with that member, a two-part rotatable support $c\ c'$, an intermediate gear-train $A^7\ A^8\ A^9$, carried partly on each division of the support, adjusting apparatus for varying the angular adjustment of the support divisions and said element and member in relation to each other and to the member $A^8$ of the train, the coöperating element of the pump rotatable and connected with the driven member, a fluid-pressure power and speed adjuster having one of its elements connected with the driven member, a coöperating element of the adjuster, a relatively-fixed but adjustable crank-shaft with which that coöperating element of the adjuster is operatively connected, discharge-ducts extending from the pump to the adjuster and comprising a by-pass duct affording communication between the pump-discharge and the pump-suction chamber, a valve to divert the discharge fluid of the pump in variable proportions through the adjuster and into the suction-chamber through those ducts, a ring, a slider O on which the ring can turn constituting an operative connection between the by-pass valve and a valve-operating rod N extending to the exterior of the casing through the adjustable crank with which also it is operatively connected, a lever connected with the valve-operating rod N, a disk with a spiral incline J⁵ upon it to operate the lever, and means for maintaining said lever in its operative relation to the spiral incline, a valve controlling the distribution of the motive fluid for an adjuster-cylinder, an eccentric controlling the operation of said valve, a pivot-pin upon which the eccentric is rotatable, and a connection between the adjuster crank-shaft and that eccentric whereby the angular advance of the eccentric is maintained constant in relation to the adjustable "virtual-crank" arm of the adjuster; substantially as described.

39. In a power-transmitting device, the combination with a driving member and a driven member, of a pressure-creating device, such as a pump, having one of its elements connected with the driven member, and its coöperating element connected with the driving member, a power and speed adjuster actuated by the pressure-creating device or pump and controlling the movement of the driven member, with means for varying the relative capacities of the pressure-creating device and the adjuster, and a by-pass for opening communication between the discharge of the pressure-creating device or pump and the suction-chamber thereof; substantially as described.

In witness whereof I have hereto set my hand in the presence of the two subscribing witnesses.

JOHN WILLIAM HALL.

Witnesses:
ALFRED J. BOULT,
HARRY B. BRIDGLY.